United States Patent [19]

Minami et al.

[11] Patent Number: 4,475,617
[45] Date of Patent: Oct. 9, 1984

[54] ENGINE INTAKE SYSTEM FOR MOTORCYCLES

[75] Inventors: Shunji Minami, Fururoi; Hiroshi Kimura, Iwata, both of Japan

[73] Assignee: Yamaha Hatsudoki Kabushiki Kaisha, Japan

[21] Appl. No.: 302,658

[22] Filed: Sep. 15, 1981

[30] Foreign Application Priority Data

Sep. 16, 1980 [JP] Japan ................................ 55-128145

[51] Int. Cl.³ ...................... F02D 23/00; B60K 13/00; B62K 11/04
[52] U.S. Cl. ..................................... 180/219; 60/605; 123/559; 280/293; D12/110
[58] Field of Search ....................... 180/219, 229, 291; 280/281 R, 293–298; D12/110; 60/605; 123/559

[56] References Cited

U.S. PATENT DOCUMENTS

| | | | |
|---|---|---|---|
| 4,223,906 | 9/1980 | Gratza | 180/219 X |
| 4,280,582 | 7/1981 | Kouyama et al. | 180/219 |
| 4,356,877 | 11/1982 | Kamiya | 180/227 |
| 4,363,375 | 12/1982 | Kamiya | 180/227 |

FOREIGN PATENT DOCUMENTS

| | | | |
|---|---|---|---|
| 64337 | 5/1979 | Japan | 180/219 |
| 118907 | 9/1979 | Japan | 60/605 |

OTHER PUBLICATIONS

Yamaha Brochure: "How to Build a Motorcycle", Copyright Yamaha Motor Corporation U.S.A., 1977.

Primary Examiner—Joseph F. Peters, Jr.
Assistant Examiner—Mitchell J. Hill
Attorney, Agent, or Firm—Ernest A. Beutler

[57] ABSTRACT

Two embodiments of turbo-charged motorcycle arrangements wherein the turbo-charger is located so as to be protected by the stand of the motorcycle when the stand is in its retracted position.

7 Claims, 3 Drawing Figures

ENGINE INTAKE SYSTEM FOR MOTORCYCLES

BACKGROUND OF THE INVENTION

This invention relates to an engine intake system for motorcycles, and more particularly to an improved layout for a motorcycle emboding a supercharger, wherein the configuration of the motorcycle is such that the supercharger is protected from damage and further, that the induction system is located so that it will not interfere with normal maintenance of the motorcycle.

Recently it has been proposed to employ forced induction systems for motorcycles. Such forced induction systems employ exhaust driven superchargers (turbo-chargers) to increase the output of the engine. However, due to the compact nature of motorcycles, it is extremely difficult to locate all of the components associated with the turbo-charger in a location where they will not interfere with the remaining components of the vehicle, and furthermore, where the turbo-charger will be protected from damage.

It is, therefore, a principle object of this invention to provide an improved motorcycle layout wherein the turbo-charger is located so as to be protected by the normal components of the motorcycle.

It is another object of this invention to provide a motorcycle induction system employing a supercharger wherein the components are located in such a way that they will not interfer with normal maintenance of the motorcycle.

SUMMARY OF THE INVENTION

A first feature of this invention is adapted to be embodied in a motorcycle having wheels, a supporting frame assembly, an internal combustion engine for powering the motorcycle, drive means for transferring the drive from the engine to one of the wheels, and an induction system for the engine, including a supercharger for providing a boost in the pressure of the intake charge. In accordance with this feature of the invention, the supercharger is located relative to the remaining components of the motorcycle so as to be protected thereby.

Another feature of this invention is also adapted to be embodied in a motorcycle having a frame including a stand movable between a running position and a supporting position and adapt to support the motorcycle when in its supporting position. In accordance with this feature of the invention, the motorcycle is provided with a supercharger for providing a boost to the pressure in the intake charge of the engine. The supercharger is located relative to the stand so that it will be protected by the stand when the stand is in its running position.

DETAILED DESCRIPTION OF THE PREFERRED EMBODIMENTS

Figure 1:
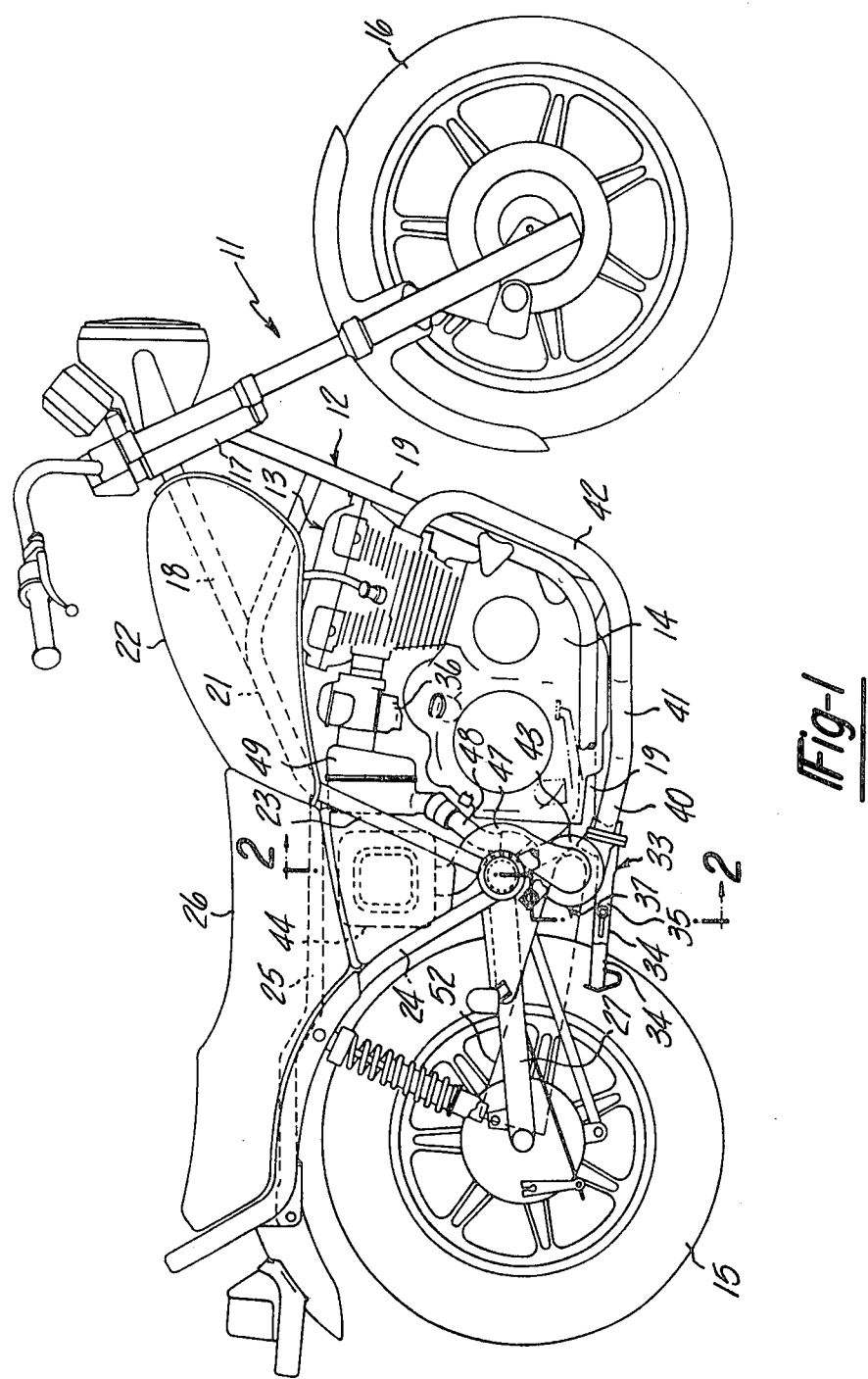
FIG. 1 is a side elevational view of a motorcycle constructed in accordance with a first embodiment of the invention.
Figure 2:
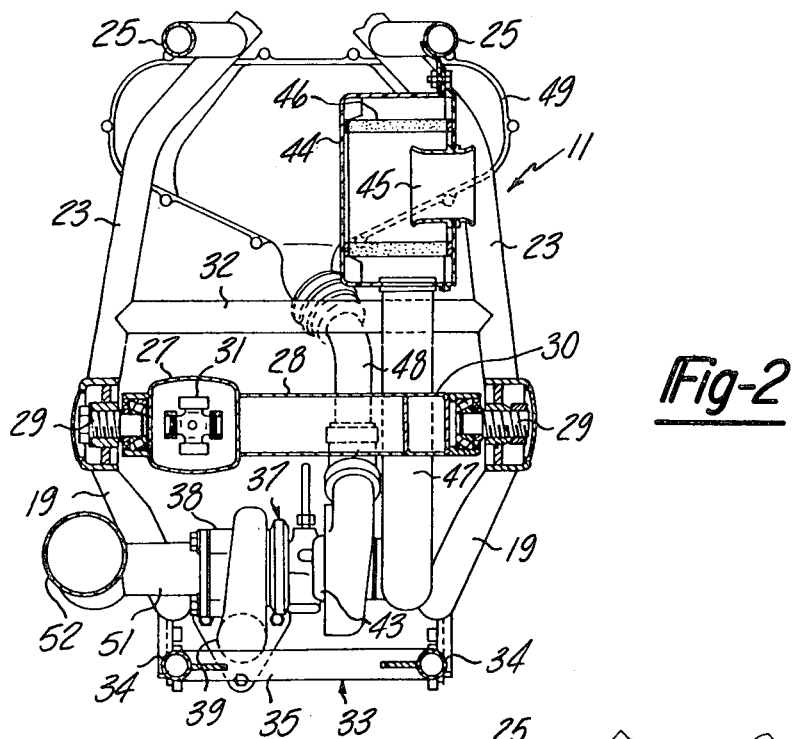
FIG. 2 is a cross-sectional view taken along the line 2—2 of FIG. 1.

Referring first to the embodiments of FIGS. 1 and 2, a motorcycle constructed in accordance with this embodiment is identified generally by the reference numeral 11. The motorcycle 11 includes a frame assembly, indicated generally by the reference numeral 12, which supports an internal combustion engine 13 in a known manner. The engine 13 has a crankcase, clutch and transmission assembly 14, which provides the final drive to a rear wheel 15 of the motorcycle 11 in a manner to be described. The frame 12 also supports a steerable front wheel 16 in a known manner.

The frame 12 is of a tubular construction made up of upper and lower components and includes a head tube 17, a main pipe 18, and a pair of down tubes 19. Tank rails 21 are connected to the down tubes 19, and provide the support for a saddle-shaped fuel tank 22 in a known manner. The tank tubes 21 are integral with seat pillar tubes 23 that extend downwardly. A pair of backstays 24 are connected to the lower ends of the seat pillar tubes 23 and a pair of seat rails 25 that extend rearwardly from the juncture between the tank tubes 21 and the seat pillar tubes 23. The seat rails 25 support a seat 26 in a known manner.

A pair of trailing arms 27 and 30 support the rear wheel 15 at their rearward ends in a known manner. The arms 27 and 30 are connected together at their forwardmost end by means of a cross tube 28, which is pivotally mounted by a pair of spaced bearings 29 located at the juncture between the down tubes 19 and seat pillar tubes 23. The trailing arm 27 at the left-hand side of the motorcycle 11, as viewed in FIG. 2, encloses the drive shaft (not shown) and universal joints 31 for providing the final drive to the rear wheel 15 in a known manner. A cross reinforcing tube 32 extends between and is affixed to the seat pillar tubes 23 in parallel relation to the cross tube 28 so as to provide further reinforcing for the frame 12.

A main stand, indicated generally by the reference numeral 33, is provided for supporting the motorcycle 11 when not in use and in a substantially verticle position. The main stand 33 has a generally "H" shape as seen in plan view and is comprised of a pair of longitudinal arms, constructed from pipes 34, interconnected by a cross pipe or cross arm 35. The main stand 33 is pivotally supported at the lower end of the down tubes 19, adjacent their termination near the rear wheel 15. The stand 33 is supported for pivotal movement between a downwardly extending position wherein the motorcycle 11 may be partially supported on the extended arms 34 to an upward, retracted position as shown in FIGS. 1 and 2. In this retracted position, the rearwardly extending portion of the arms 34 will extend on opposite sides of the rear wheel 15. In this latter storage position, the stand 33 extends in a substantially horizontal direction.

The engine 13 is of any known type and is illustrated as having a plurality of cylinders, for example four that operate on the four stroke cycle. The engine 13 is provided with an induction system consisting of one or more carburetors 36 that serve the intake ports of the engine. A supercharger, of the turbo-charger type, is indicated generally by the reference numeral 37, and is provided for supplying air under pressure to the inlets of the carburetors 36. As will become apparent, the turbo-charger 37 is located in such a way that it will be protected by the components of the motorcycle 11, and further, is located conveniently within the confines of the motorcycle 11 so that it will be isolated from other of the engine components and yet permits an effective induction system.

The turbo-charger 37 includes an exhaust driven turbine stage 38, having an inlet portion 39 that receives exhaust gases from a collector outlet pipe 40 of the exhaust system of the engine 13. Exhaust gases are delivered to a collector section 41 from the individual cylinders by means of exhaust pipes 42 and then to the outlet pipe 40. The exhaust gases drive the turbine stage 38 in a known manner and are discharged from the turbine stage 38 to an outlet pipe 51 for discharge to the atmosphere via a muffler 52.

The turbine stage 38 of the turbo-charger 37 drives a compressor stage 43 in a known manner. An air cleaner, indicated generally by the reference numeral 44, is provided for delivering filtered air to the turbo-charger compressor stage 43. The air cleaner 44 is provided with an air inlet 45 and a filter element 46 for filtering the intake air. After the intake air has passed through the filter element 46, it is delivered to the compressor stage inlet by means of an intake pipe 47 that extends in a generally downward direction, and which is disposed forwardly of the cross tube 28 of the rear suspension. The air which has been compressed by the compressor stage 43 is discharged into an intake pipe 48 which discharges into a plenum chamber 49. The pipe 48 is disposed adjacent the pipe 47 and is also located forwardly of the cross tube 28. The plenum chamber 49 is provided so as to afford sufficient volume to serve the intake of the carburetors 36 and to minimize pressure variations between the individual intakes resulting from their intake strokes. This insures that there will be laminar air flow from the plenum chamber 49 into the individual intakes of the carburetors 36.

From an inspection of the drawings, it should be clear that the turbo-charger 37 is positioned low in the frame and with its axis of rotation extending parallel to and closely adjacent the retracted position of the stand 33. In this location, the turbo-charger 37 will be protected on its lower side by the stand 33. Furthermore, the rotating components of the turbo-charger 33 are positioned inwardly of the down tubes 19 so as to be protected thereby. The turbo-charger 37 is also disposed adjacent the crankcase and transmission 14 of the engine 13 so as to be protected in a forwardmost direction from it. Thus, it should be clear that the components of the turbo-charger 37 are well protected within the surrounding portions of the motorcycle.

In addition, the low positioning of the turbo-charger 37 within the frame 12 permits it to be located remotely from such accessories as the battery and coil so as to isolate the heat generated by the turbo-charger 37 from these critical components of the motorcycle 11.

As has been noted, the turbo-charger 37 is positioned beneath and slightly forwardly of the cross tube 28, so that it will be protected further by this element of the motorcycle 11. The air inlet pipe 47 feeding the turbo-charger compressor stage 43 and the discharge pipe 48 are both located forwardly of the cross tube 28, and in a compact relationship to the remaining components. The air cleaner 44 is suspended from one of the seat rails 25 and is positioned at a relatively high location in the frame 12. In a like manner, the plenum chamber 49 is so suspended and is positioned closely adjacent the air cleaner 44 and the carburetors 36. This placement permits relatively short lengths for the pipes 47 and 48 so as to minimize the flow restrictions through the induction system, and further improve performance. Furthermore, this permits the air cleaner 44 and plenum chamber 49 to be located in an otherwise unused space of the motorcycle 11 so as to further improve the compactness of design. At the same time, the placement of the various induction system components is such that the remaining components of the motorcycle 11 may be serviced without necessitating removal of any of the induction system components. For example, the rear suspension, including the trailing arms 27 and 30, may be serviced without necessitating the removal of any of the induction system components aided in part by the forwardmost placement of the pipes 47 and 48.

Figure 3:
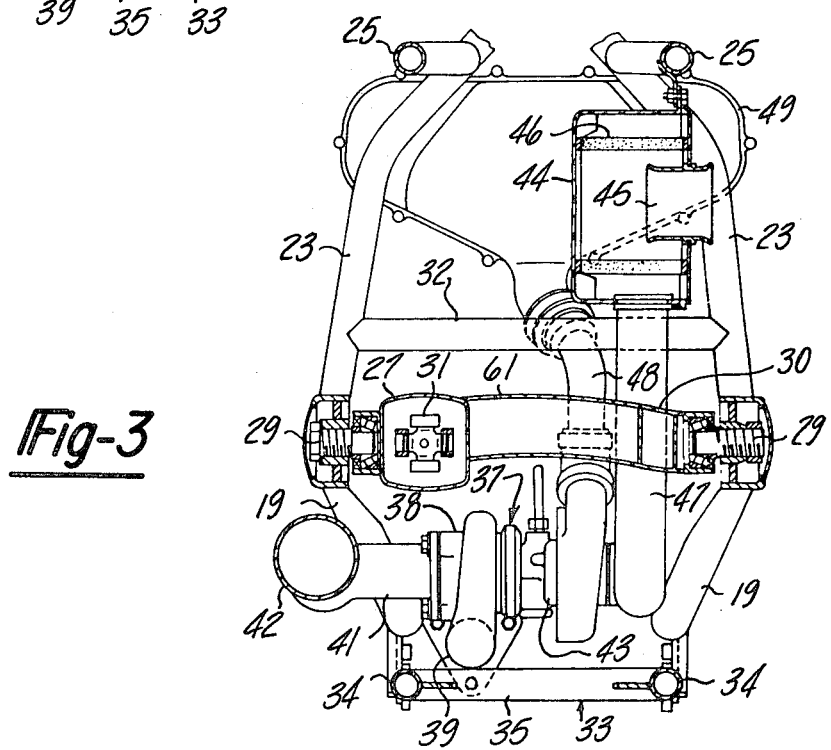
FIG. 3 is a cross-sectional view, in part similar to FIG. 2, showing another embodiment of the invention.

In the embodiment of the invention described and illustrated in FIGS. 1 and 2, the positioning of the turbo-charger 37 in part underneath the cross tube 28, may necessitate that a portion of the turbo-charger extend between the side post 34 of the stand 33 as shown in FIG. 2. If it is desired to provide clearance and insure that no portion of the supercharger 37 extends into the area between the components of the stand 33, an arrangement may be provided as shown in FIG. 3. In this embodiment, all components except for the cross tube are as previously described and illustrated. For that reason, these elements will not be described again, and have been identified by the reference number.

In this embodiment, the trailing arms 27 are interconnected by a cross tube 61 that is arcuate in configuration in the area between where the trailing arms 27 and 30 are attached. This arcuate "kick up" in the tube 61 permits the turbo-charger 37 to be mounted slightly higher in the frame 12 than in the previously described embodiment. Thus, no part of the turbo-charger 37 need lie between the elements of the retracted stand 33. In addition to the advantages of protection of the supercharger 37 by the various components of the motorcycle, this embodiment has the increased advantage of improving ground clearance.

From the foregoing description, it should be readily apparent that two embodiments of the invention have been disclosed, wherein the turbo-charger is located in such a way as to be protected by the existing components of the motorcycle, maximum space utilization has been achieved without interference with the normal maintenance operation of the motorcycle, and the length of the intake system components has been maintained as short as possible so as to reduce induction system inefficiencies. Although two embodiments have been disclosed, it is to be understood that various changes and modifications may be made from the disclosed embodiments without departing from the spirit and scope of the invention, as defined by the appended claims.

We claim:

1. In a motorcycle having wheels, a supporting frame assembly, an internal combustion engine for powering said motorcycle, drive means for transferring the drive from said engine to one of said wheels, a stand pivotally supported by said frame assembly and adapted to support the motorcycle when in an upright position, and an induction system for said engine including a supercharger for providing a boost in the pressure of the inlet charge, the improvement comprising of said supercharger being located in proximity to the retracted position of said stand and to be protected at least in part thereby when said stand is in its retracted position.

2. A motorcycle as set forth in claim 1 wherein the supercharger is positioned to the rear of the engine and the engine has exhaust ports facing forwardly and intake ports facing rearwardly, and an exhaust pipe extending from said forwardly facing exhaust ports downwardly and rearwardly beneath the engine to communicate with said supercharger.

3. In a motorcycle having wheels, a supporting frame assembly having upper and lower components, an internal combustion engine for powering said motorcycle, drive means for transferring the drive from said engine to one of said wheels, said rear wheel being supported by a pair of trailing arms pivotally supported on said frame assembly, and an induction system for said engine including a supercharger for providing a boost in the pressure of the inlet charge, the improvement comprising said supercharger being located above said lower component of said frame below said pivotal support for said arms and adjacent to the rear wheel and to the rear of said engine, said engine having an exhaust port facing forwardly and an intake port facing rearwardly, and an exhaust pipe extending from said forwardly facing exhaust port downwardly and rearwardly to said supercharger.

4. A motorcycle as set forth in claim 3 further including a plenum chamber interposed between the supercharger outlet and the chambers of the engine, said plenum chamber being mounted in said frame assembly toward the uppermost portion thereof, an air cleaner mounted contiguous to said plenum chamber and communicating with the supercharger inlet through an inlet pipe that is positioned forwardmost of the pivotal support for the trailing arms.

5. A motorcycle as set forth in claim 4 and wherein the lower component of the frame comprises a stand pivotally supported by a frame assembly and adapted to support the motorcycle when in an upright position, the supercharger being positioned in proximity to the retracted position of the stand and to be protected at least in part thereby when said stand is in its retracted position.

6. A motorcycle as set forth in claim 3 wherein the engine has exhaust ports facing forwardly and intake ports facing rearwardly, and an exhaust pipe extending from said forwardly facing exhaust ports downwardly and rearwardly beneath the engine to a position in proximity to said supercharger.

7. In a motorcycle having wheels, a supporting frame assembly, an internal combustion engine for powering said motorcycle, an induction system for said engine including a supercharger for providing a boost in the pressure of the intake charge, and a stand pivotally supported by said frame assembly and movable from a supporting position in which said motorcycle may be supported thereupon to a retracted position in which said stand extends substantially horizontally, the improvement comprising said supercharger being positioned in proximity to the storage position of said stand and being protected thereby.

* * * * *